(12) United States Patent
Goodson et al.

(10) Patent No.: US 12,482,034 B2
(45) Date of Patent: Nov. 25, 2025

(54) SOFTWARE FOR TILE PATTERN DESIGNS AND ASSEMBLING TILE KITS

(71) Applicant: FeltRight, LLC, Draper, UT (US)

(72) Inventors: Talley Goodson, Salt Lake City, UT (US); Jordan Garn, Orem, UT (US)

(73) Assignee: FeltRight, LLC., Draper, UT (US)

( * ) Notice: Subject to any disclaimer, the term of this patent is extended or adjusted under 35 U.S.C. 154(b) by 583 days.

(21) Appl. No.: 17/887,643

(22) Filed: Aug. 15, 2022

(65) Prior Publication Data

US 2023/0051224 A1 Feb. 16, 2023

Related U.S. Application Data

(60) Provisional application No. 63/232,924, filed on Aug. 13, 2021.

(51) Int. Cl.
*G06F 3/048* (2013.01)
*G06F 3/0481* (2022.01)
*G06F 3/0482* (2013.01)
*G06F 3/04842* (2022.01)
*G06F 3/04845* (2022.01)
*G06F 3/04847* (2022.01)
*G06Q 30/0601* (2023.01)

(52) U.S. Cl.
CPC ....... *G06Q 30/0643* (2013.01); *G06F 3/0481* (2013.01); *G06F 3/0482* (2013.01); *G06F 3/04842* (2013.01); *G06F 3/04845* (2013.01); *G06F 3/04847* (2013.01); *G06Q 30/0633* (2013.01)

(58) Field of Classification Search
CPC ............ G06Q 30/0643; G06Q 30/0633; G06F 3/0481; G06F 3/0482; G06F 3/04842; G06F 3/04845; G06F 3/04847
See application file for complete search history.

(56) References Cited

U.S. PATENT DOCUMENTS

| | | | | |
|---|---|---|---|---|
| 2002/0175942 | A1* | 11/2002 | Seitz, Jr. ................ | G06Q 30/02 715/764 |
| 2004/0113945 | A1* | 6/2004 | Park ....................... | G06F 30/13 715/765 |
| 2005/0068290 | A1* | 3/2005 | Jaeger ................. | G06F 3/04845 345/156 |
| 2007/0233579 | A1* | 10/2007 | Saarinen ............ | G06Q 30/0633 705/26.8 |
| 2010/0001992 | A1* | 1/2010 | Schultz .................. | G06T 19/00 345/419 |

(Continued)

OTHER PUBLICATIONS

Precision Tile Pro, Tile Layout and Design Software (Year: 2018).*
Precision Tile Pro (Year: 2018).*

*Primary Examiner* — Mahelet Shiberou
(74) *Attorney, Agent, or Firm* — Workman Nydegger

(57) ABSTRACT

A server computing system configured to display a graphical user interface of a design studio at a client computing system. The graphic user interface has a design area and a user selection area. The design area has a plurality of grids, and the user selection area includes a plurality of selectable attributes of tile. The server computing system is also configured to generate and display a tile pattern design in the design area based on one or more user inputs at the client computing system.

18 Claims, 15 Drawing Sheets

(56) References Cited

U.S. PATENT DOCUMENTS

| | | | |
|---|---|---|---|
| 2010/0302274 A1* | 12/2010 | Lee | H04N 21/4438 |
| | | | 345/619 |
| 2013/0222423 A1* | 8/2013 | Fields | G06F 9/451 |
| | | | 345/629 |
| 2014/0108953 A1* | 4/2014 | Greene | G06F 3/04842 |
| | | | 715/747 |
| 2019/0325087 A1* | 10/2019 | Parry | G06T 11/001 |
| 2021/0232988 A1* | 7/2021 | Thornberry | G06Q 50/08 |

* cited by examiner

300A

New Design

From Scratch

Start a new design from scratch.

Gallery

Choose from a premade design, then start customizing.

SOFTWARE FOR TILE PATTERN DESIGNS AND ASSEMBLING TILE KITS

CROSS-REFERENCE TO RELATED APPLICATIONS

This application claims the benefit of and priority to U.S. Provisional Application No. 63/232,924 filed on Aug. 13, 2021, the entire content of which is incorporated herein by reference.

BACKGROUND

People often decorate their walls with canvas art, framed art, photo frames, decorative tiles, and more. However, most wall décor is not customizable. For example, commercially available decorative tile patterns are often fixed on a backing mesh based on a predesigned pattern, and a customer cannot rearrange those tiles. Further, the size of such a decorative tile pattern is limited.

BRIEF SUMMARY

Embodiments described herein are related to a server computing system, a method, and/or a computer program product for designing tile patterns for decorative purposes. The server computing system is configured to display a graphical user interface of a design studio at a client computing system for a user at the client computing system to generate their own custom tile pattern designs. These designs may be realized by any type of tiles, including (but not limited to) felt tiles, ceramic tiles, stone tiles, wood tiles, bamboo tiles, and/or vinyl tiles. In some embodiments, the server computing system may include a portal for customer users and a portal for store employees, and the server computing system may link the tiles used in the customer's design to the available products of one or more tile stores. As such, the user can generate their own creative design and purchase the tiles used in the design from the one or more tile stores conveniently.

The graphical user interface of the design studio has a design area and a user selection area. The design area has a plurality of grids. The user selection area includes a plurality of selectable attributes of tiles. The plurality of attributes comprises at least one of (1) one or more shapes of tiles, (2) one or more colors of tiles, (3) one or more orientations of tiles, and/or (4) one or more patterns of tiles. The computing system is further configured to generate and display a design in the design area based on one or more user inputs. Further, in some embodiments, generating and displaying of the design includes (i) receiving a first user input, selecting at least one of the plurality of selectable attributes of tiles from the user selection area, (ii) receiving a second user input, placing a tile having the selected at least one attribute at a particular position of the design area, (iii) identifying a grid or a fraction of a grid that is closest to the particular position indicated by the second user input, (iv) snapping the tile to the identified grid or the identified fraction of the grid in the design area, and (v) repeating steps (i) through (iv) until the design is completed.

In some embodiments, the server computing system is also configured to compute a total price of tiles used in the design and display the computed total price at the client computing system. In some embodiments, the server computing system is also configured to compute an amount of adhesive (e.g., a number of adhesive tabs) required for installing all the tiles in the shopping cart and automatically add the amount of adhesive into a shopping cart. In some embodiments, in response to checking out the shopping cart by the user, the server computing system is configured to store an order record associated with the user in one or more computer-readable hardware storage devices and send the order record to a second client computing system associated with a tile store that provides tiles used in the design by the user.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Embodiments described herein are related to a server computing system (e.g., a web server), a method, and/or a computer program product. The server computing system is configured to display a graphical user interface of a design studio at a client computing system for a user at the client computing system to generate their own custom tile pattern designs. These designs may be realized by any type of tiles, including (but not limited to) felt tiles, ceramic tiles, stone tiles, wood tiles, bamboo tiles, and/or vinyl tiles. In some embodiments, the server computing system may include a portal for customer users and a portal for store employees, and the server computing system may link the tiles used in the customer's design to the available products of one or more tile stores. As such, the user can generate their own creative design and purchase the tiles used in the design from the one or more tile stores conveniently.

Figure 1:
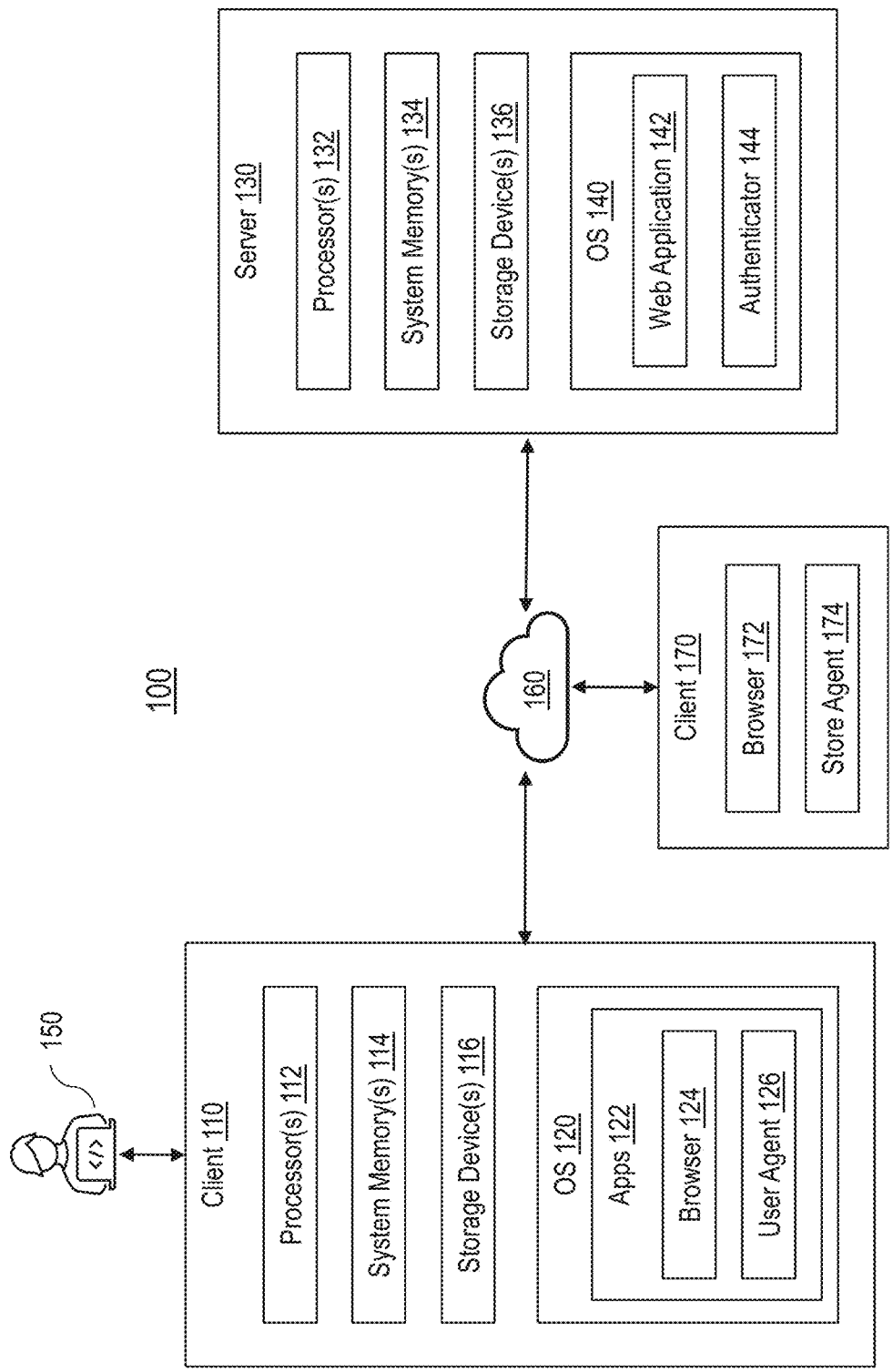
FIG. 1 illustrates an example environment in which the principles described herein may be implemented.

FIG. 1 illustrates an example environment 100 that includes a server computing system 120, a first client computing system 110, and a second client computing system 170, configured to communicate with each other via a network 160. The network 160 may be the Internet. The first client computing system 110 may be a personal computer, a laptop, a mobile device of a user 150. The first client computing system 110 may include one or more processors 112, one or more system memories 114, and/or one or more storage devices 116. In some embodiments, the client computing systems 110 may also include an operating system 120 installed in the storage devices 116 and loaded into the system memories 114. The first client computing system 110 may also include one or more applications installed in the storage devices 116 and loaded in the system memories 114. In some embodiments, one or more applications 112 include a browser 124 configured to execute a web application 144 hosted at the server computing system 130. In some embodiments, the one or more applications 112 includes a user agent 126 configured to allow a user to interact with the server computing system 130 in a predetermined manner.

The server computing system 130 may be a web server that hosts a web application 144. As illustrated, the server computing system 130 may include one or more processors 132, one or more system memories 134, and/or one or more storage devices 136. The server computing system 130 may also include an operating system 140 installed in the one or more storage devices 136 and loaded in the system memories 134. In some embodiments, in addition to the web application 142, the server computing system 130 also includes or is coupled to an authenticator 144 configured to register new users and/or authenticate existing users.

Further, the server computing system 130 is also configured to display a graphical user interface of a design studio at the first client computing system 110. In some embodiments, the graphical user interface may be displayed in the browser 124 of the first client computing system 110. In some embodiments, the graphical user interface may be displayed in the user agent application 126 of the first client computing system 110. The user can use the graphic user interface to generate a custom tile pattern design and order the tiles used in the custom design from a store.

Further, as shown in FIG. 1, there may also be a second client computing system 170. Similar to the first client computing system 110, the second client computing system 170 also includes one or more processors, one or more system memories, storage devices, and an operating system (not shown). However, unlike the first client computing system 110, the second client computing system 170 is configured to allow a store representative to access records associated with orders made by the users. In some embodiments, the store representative can use the browser 172 to access a store-side web portal and/or use a store agent application 174 to access records associated with orders made by the users. In some embodiments, when the user makes an order via the first client computing system 110, the server 130 causes the second client computing system 170 to generate a notification and/or displays the order summary to the store representative, such that the store representative can assemble a tile kit based on the order summary.

Note, even though FIG. 1 only shows one computing system that is associated with a customer user and one computing system that is associated with a tile store, in reality, there may be many different customer users using many different client computing systems, and there may be many different store representatives for a particular tile store or for many different tile stores using many different client computing systems. All the different client computing systems associated with customer users and store representatives may be configured to communicate with the server computing system 130 substantially simultaneously.

Figure 2:
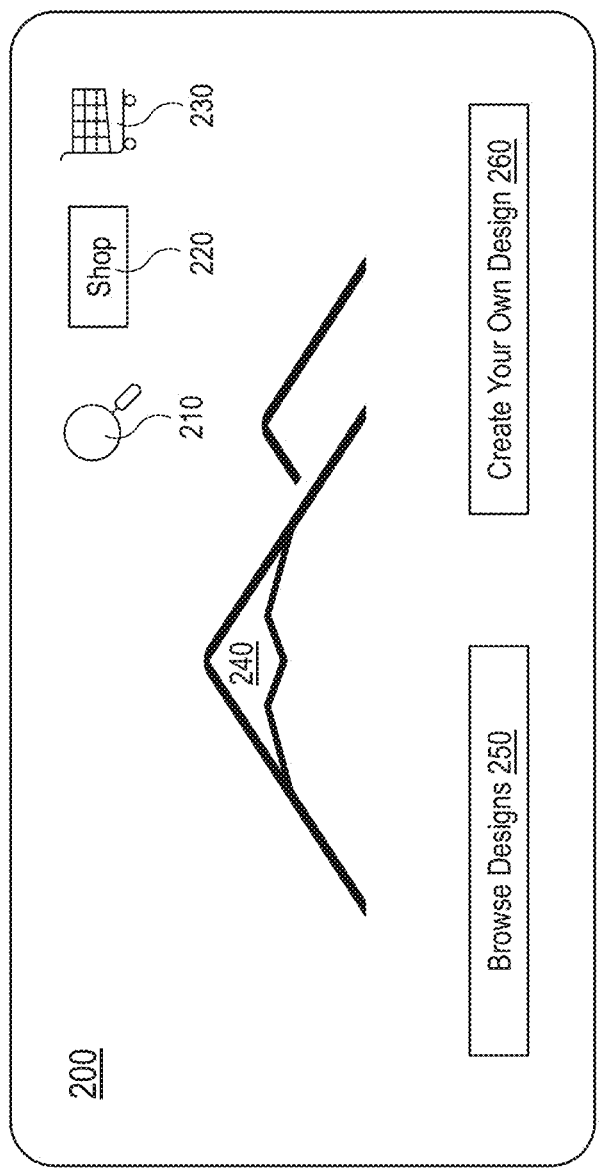
FIG. 2 illustrates an example of a graphical user interface that allows a user to browse premade designs or create their own design.

FIG. 2 illustrates an example of a graphical user interface 200 that may be displayed at the browser 124 or the user agent application 126 of the first client computing system 110. The graphical user interface 200 may include a background image 240, a search icon 210, a shop button 220, and/or a shopping cart icon 230. The background image 240 may be a popular tile pattern design. The search icon 210 may be configured to allow a user to input one or more search terms for searching the website or the application. The shop button 220 may be configured to allow a user to shop directly from an online store selling different types of tiles. The shopping cart icon 230 may indicate how many items have been placed in a shopping cart of a user. When the user clicks the shopping cart icon 230, the user may be brought to a next interface showing a list of items placed in the shopping cart.

Further, in some embodiments, the graphic user interface 200 may also include a browse designs button 250 and a create your own design button 260. When a user clicks the browse designs button 250, the user is presented with a gallery of one or more premade designs, and the user can select a particular premade design from the gallery and modify the particular premade design based on their own desire. When the user clicks the create your own design button 260, a new design is generated, and the user can build their own design.

Figure 3A:
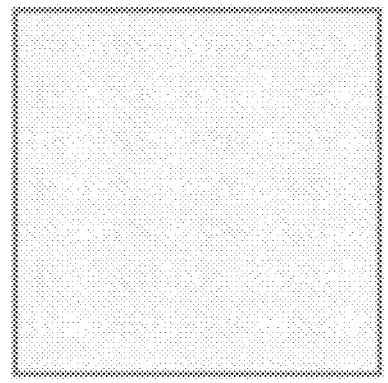
FIG. 3A illustrates another example of a graphical user interface that allows a user to choose from premade designs or start from scratch.
Figure 3A:
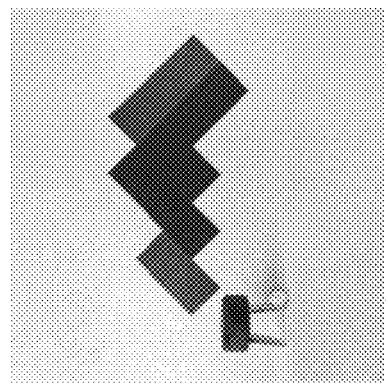

FIG. 3A illustrates another example of a graphic user interface 300A showing that a user is allowed to choose from a gallery of one or more premade designs (on the left) or choosing to start a new design from scratch (on the right). Once the user selects a premade design or starting a new design from scratch, a graphical user interface of a design studio may be displayed at the first client computing system 110.

Figure 3B:
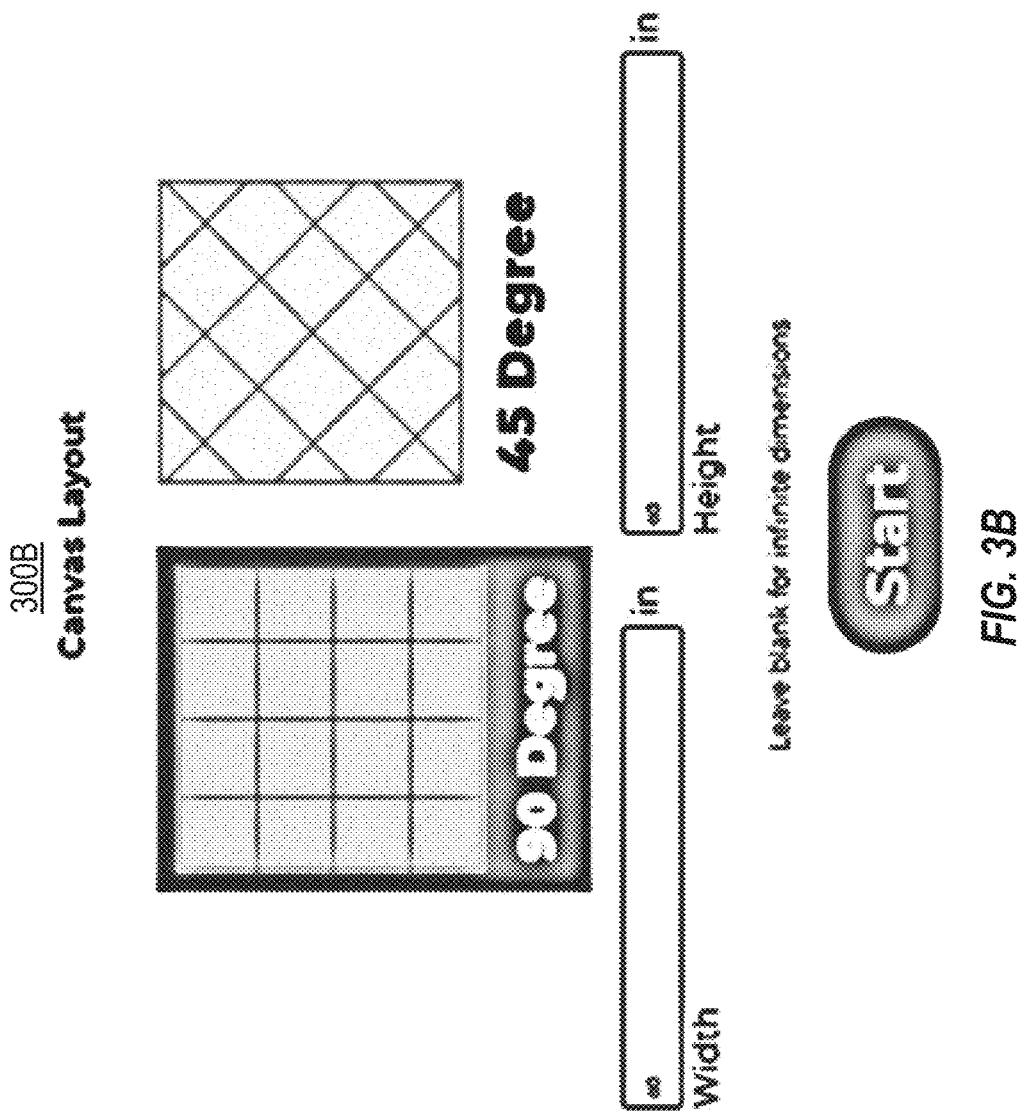
FIG. 3B illustrates another example of a graphical user interface that allows a user to choose an orientation of grid and dimensions of design.

FIG. 3B illustrates another example of a graphic user interface 300B showing that a user is allowed to choose from an orientation of grids that are to be displayed in the design area, such as (but not limited to) 90 degrees and 45 degrees. In some embodiments, the user is also allowed to choose dimensions of the design, including a width and a height, depending on the needs of the user. For example, if the user intends to place a design in a wall having a dimension of 70 inches×40 inches, the user can fill in the dimensions of the design based on the dimensions of the wall.

Figure 4:
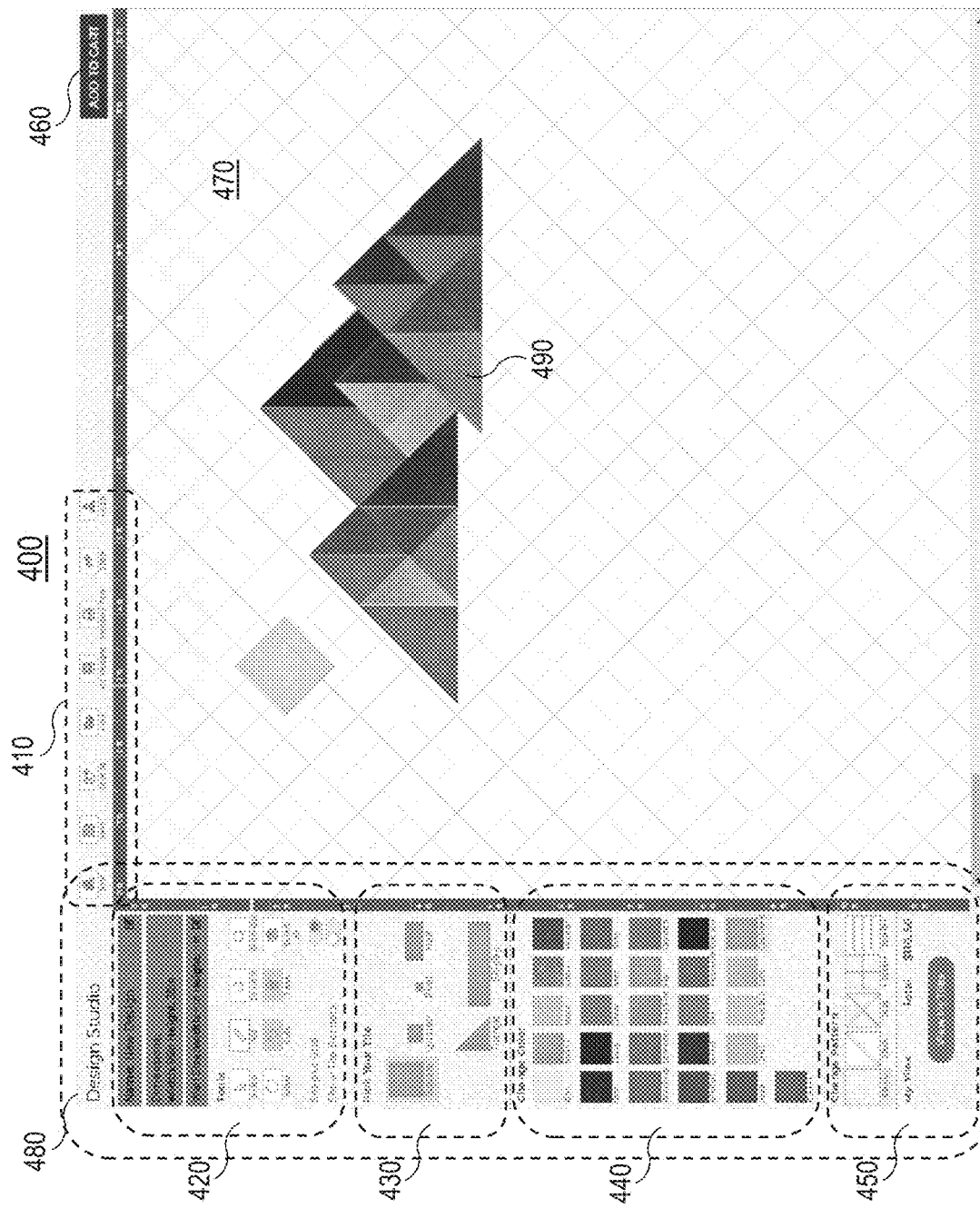
FIG. 4 illustrates an example of a graphical user interface of a design studio that includes a design area and a user selection area.

FIG. 4 illustrates an example of a graphical user interface of a design studio 400. The graphic user interface of the design studio 400 includes a design area 470 and a user selection area 480. The design area 470 has a plurality of grids. The user selection area 480 includes one or more subareas 410, 420, 430, 440, 450. Some of the subareas (e.g., subareas 420, 430, 440, and/or 450) include a plurality of selectable attributes of tiles that a user may select. The plurality of attributes includes at least one of (1) one or more shapes of tiles, (2) one or more colors of tiles, (3) one or more orientations of tiles, and/or (4) one or more patterns of tiles.

As illustrated in FIG. 4, subarea 430 illustrates a plurality of shapes of tiles that a user may select, subarea 440 illustrates a plurality of colors of tiles that a user may select, and subarea 450 includes a plurality of patterns that a user may select.

Figure 5A:
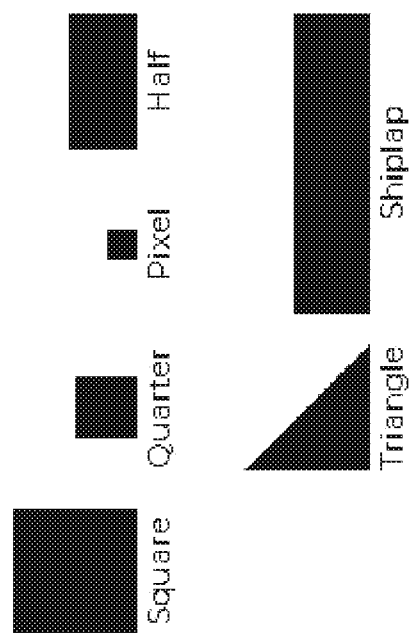
FIG. 5A illustrates an enlarged view of a subarea of the user selection area of FIG. 4 that allows a user to select a shape of a tile.

FIG. 5A illustrates an enlarged view 500A of the subarea 430 of FIG. 4 that allows a user to select a particular shape from a plurality of shapes of tiles. As illustrated in FIG. 5A, the plurality of shapes may include (but are not limited to) (1) a square shape (which has a dimension of L×L), (2) a quarter shape (which has a dimension of ½L×½L, thus, has an area that is a quarter of the square shape), (3) a pixel shape (which has a dimension of ¼L×¼L, thus has an area that is 1/16 of the square shape), (4) a half shape (which has a dimension of ½L×L, thus, has an area that is half of the square shape), (5) a triangle shape (which has a dimension of L×L, thus, has an area that is half of the square shape), and (6) a shiplap shape (which has a dimension of ½L×2L, thus, has an area that is the same as the square shape).

L may be any value chosen by the store that provides the tiles or by the users. In some embodiments, L=12 inches. As such, the square shape has a dimension of 12 in×12 in, the quarter shape (being a square) has a dimension of 6 in×6 in, the pixel shape (being a square) has a dimension of 3 in×3 in, the half shape (being a rectangle) has a dimension of 6×12, the triangle shape (being a right triangle) has a dimension of 12 in×12 in, and/or the shiplap (being a rectangle) has a dimension of 6 in×24 in.

Figure 5B:
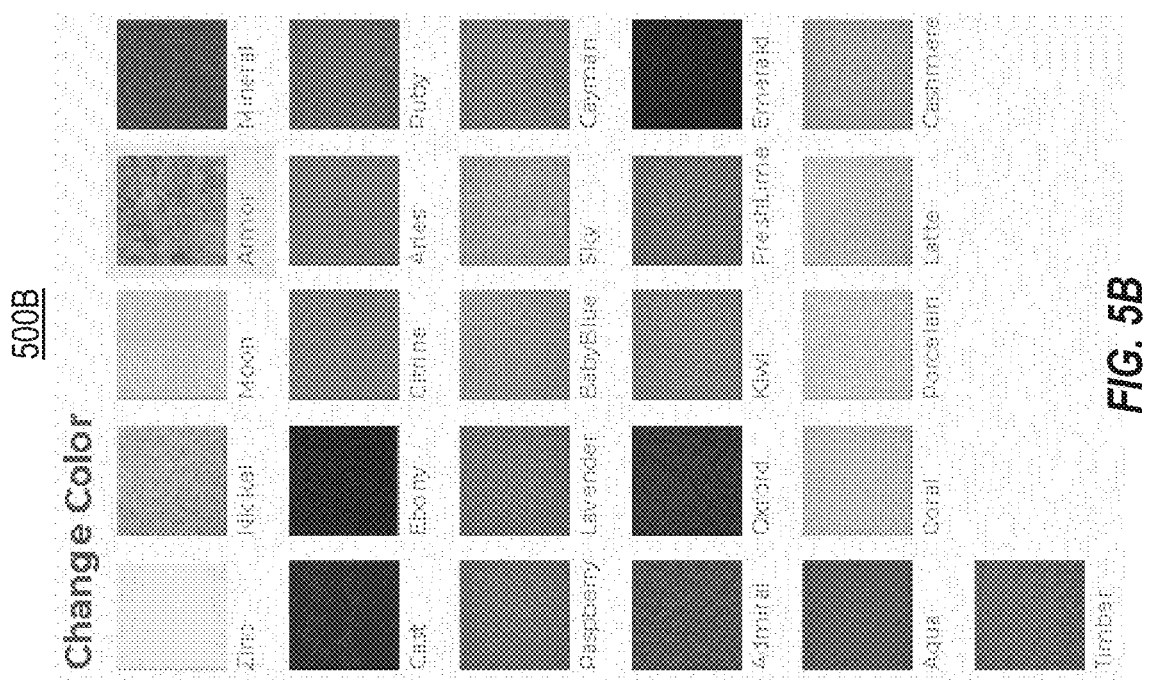
FIG. 5B illustrates an enlarged view of another subarea of the user selection area of FIG. 4 that allows a user to select a color of a tile.

FIG. 5B illustrates an enlarged view 500B of subarea 440 of FIG. 4 that allows a user to select a particular color from a plurality of colors. The plurality of colors may include (but are not limited to) a zinc color, a nickel color, a moon color, an armor color, a mineral color, a cast color, an ebony color, a citrine color, an Aries color, a ruby color, a raspberry color, a lavender color, a baby-blue color, a sky color, a Cayman color, an admiral color, an oxford color, a kiwi color, a fresh-lime color, an emerald color, an aqua color, a coral color, a porcelain color, a latte color, a cashmere color, a timber color, an ash color, a jasper color, and/or a slate-blue color. Depending on the colors of tiles that are offered by store(s), different sets of colors may be presented at the subarea 440 for different stores or at different times.

Figure 5C:
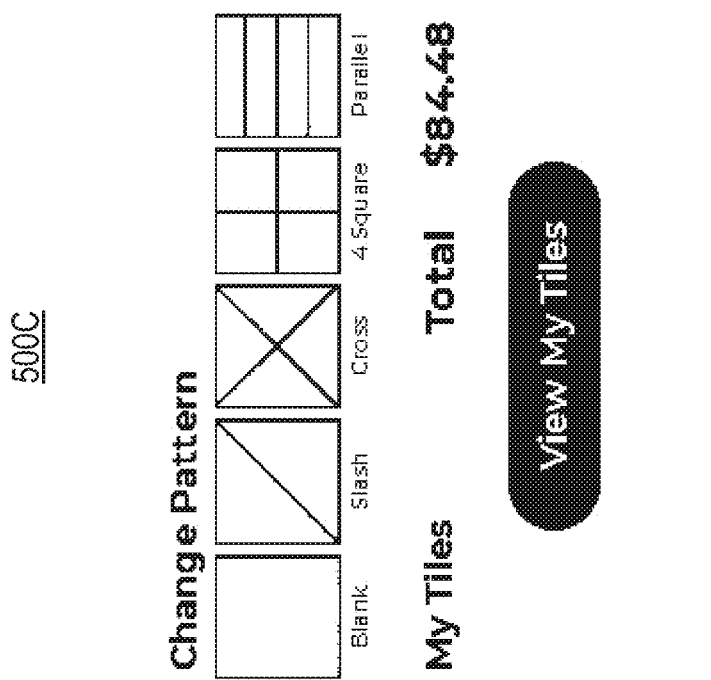
FIG. 5C illustrates an enlarged view of a subarea of the user selection area of FIG. 4 that allows a user to select a pattern of a tile.

FIG. 5C illustrates an enlarged view 500C of subarea 450 of FIG. 4 that allows a user to select a particular pattern from a plurality of patterns. The plurality of patterns may include (but are not limited to) (1) a blank pattern with no lines on a surface of a tile, (2) a slash pattern having a diagonal line across a surface of a tile, (3) a cross pattern having two diagonal lines crossing a surface of a tile, (4) a 4-square pattern having two crossing lines dividing a surface of a tile into four equal squares or rectangles, and/or (5) a parallel pattern having a plurality of lines in parallel dividing a surface of a tile into two or more rectangles in parallel. Again, depending on the patterns of tiles that are offered by store(s), different sets of patterns may be presented at the subarea 450 for different stores or at different times.

Figure 5D:
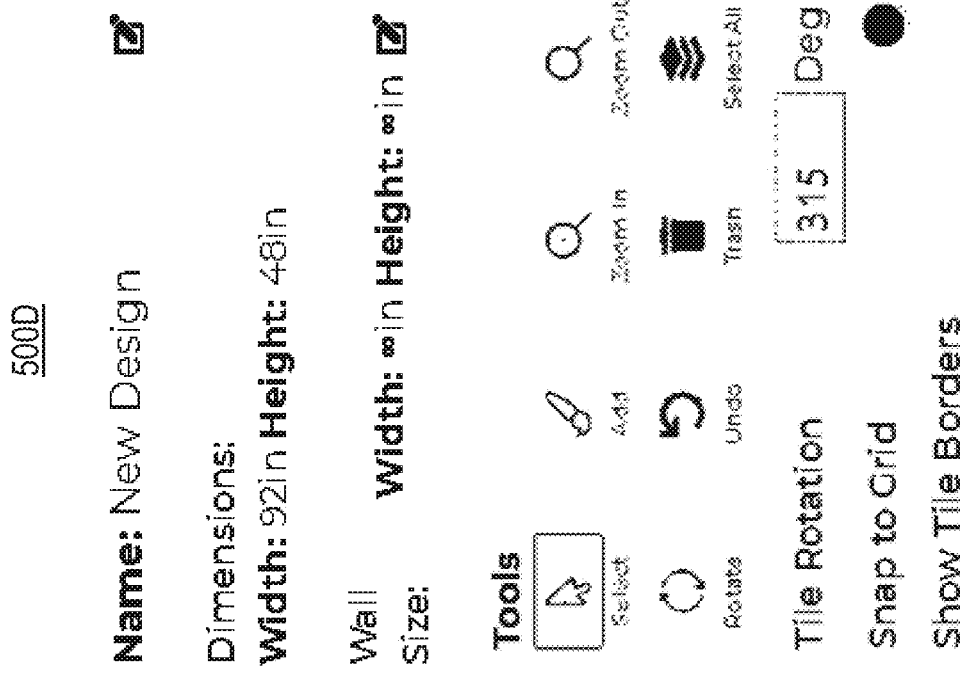
FIG. 5D illustrates an enlarged view of another subarea of the user selection area of FIG. 4 that shows a user the size of a design, and allows the user to select an orientation of a tile, whether tiles are to be snapped to a grid, and/or whether the tile borders are to be shown in the design area.

Referring back to FIG. 4, the user selection area 480 also includes a subarea 410 and a subarea 420. FIG. 5D illustrates an enlarged view 500D of the subarea 420 of FIG. 4. As illustrated, a size of one or more dimensions of the design is computed and displayed in the subarea 500D. For example, the dimensions of the design shown in the design area 470 of FIG. 4 include a width of 92 inches and a height of 48 inches. Further, the subarea 500D also includes a plurality of angles of rotations of tiles that a user may select. The plurality of angles may include (but are not limited to) (1) 0 degrees, (2) 45 degrees, (3) 90 degrees, (4) 135 degrees, (5) 180 degrees, (6) 225 degrees, (7) 270 degrees, and/or (8) 315 degrees. In some embodiments, additional or a different set of angles may be provided in the subarea 420. Alternatively or in addition, a user may be allowed to enter any desired degree (e.g., 0 through 360) without any limitations.

Figure 5E:
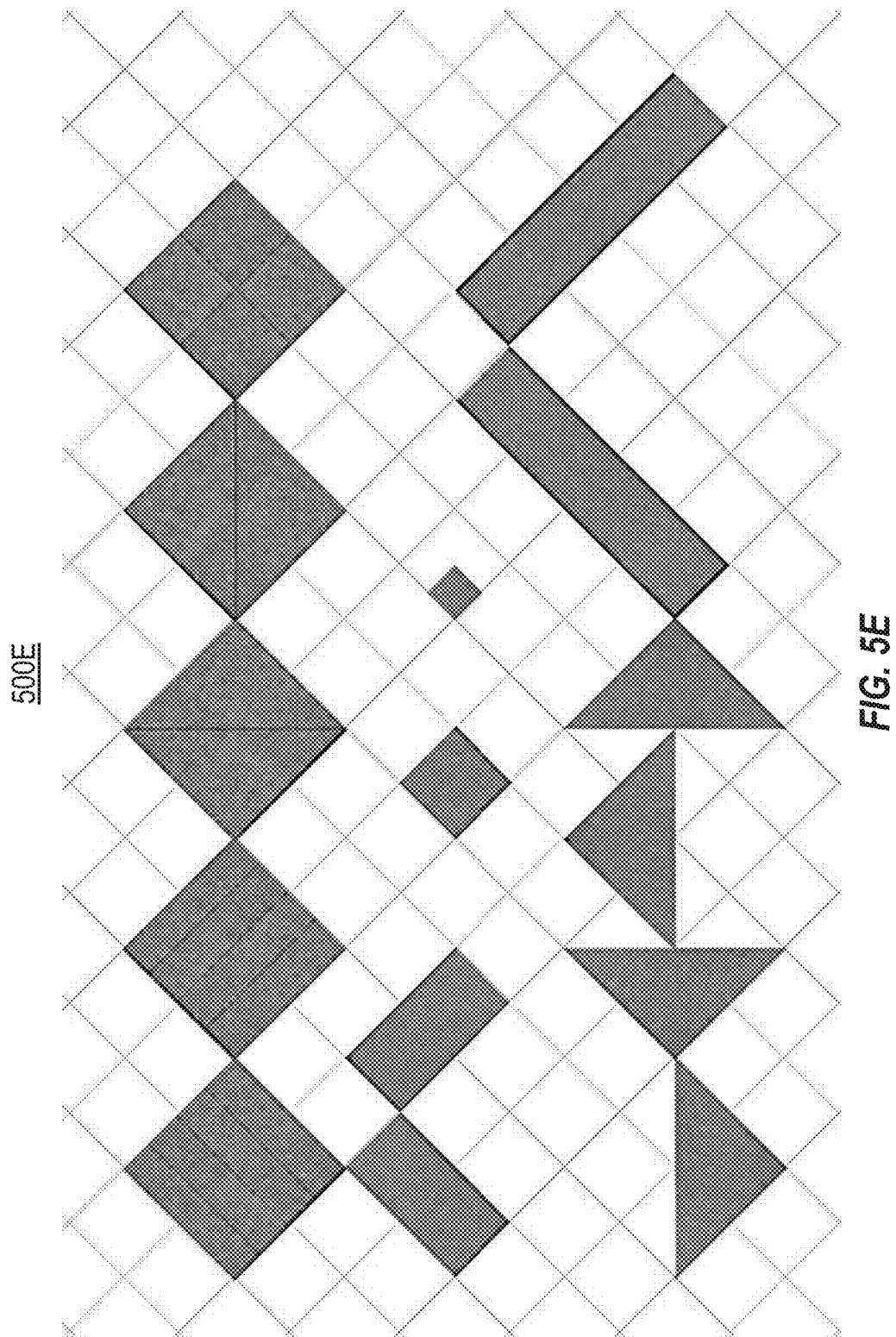
FIG. 5E illustrates different tiles having different patterns and positioned at different orientations.

FIG. 5E illustrates examples of different shaped tiles positioned at different angles. As illustrated in FIG. 5E, the angle of the shape not only can affect the orientation of the tiles, but also affect the orientation of the patterns shown on the surface of the tile.

Additionally, as shown in FIG. 5D, a user is also allowed to select whether each tile is to be snapped to a grid and/or whether the tile borders are to be shown in the display area 470. After the user selects that each tile is to be snapped to a grid, in response to a user indication placing a tile at a particular position, the computing system is configured to identify one or more grids or a fraction of one or more grid that is closest to the particular position indicated by the user indication and snap the tile to the identified grid(s) or the identified fraction of the grid(s). The one or more grids may include two grids that intersect each other, such as a horizontal grid and a vertical grid. On the other hand, after the user selects that each tile is not to snap to a grid or a fraction of a grid, in response to a user indication placing a tile at a particular position, the computing system is configured to place the tile at the particular position without snapping the tile to any grid.

Figure 5F:
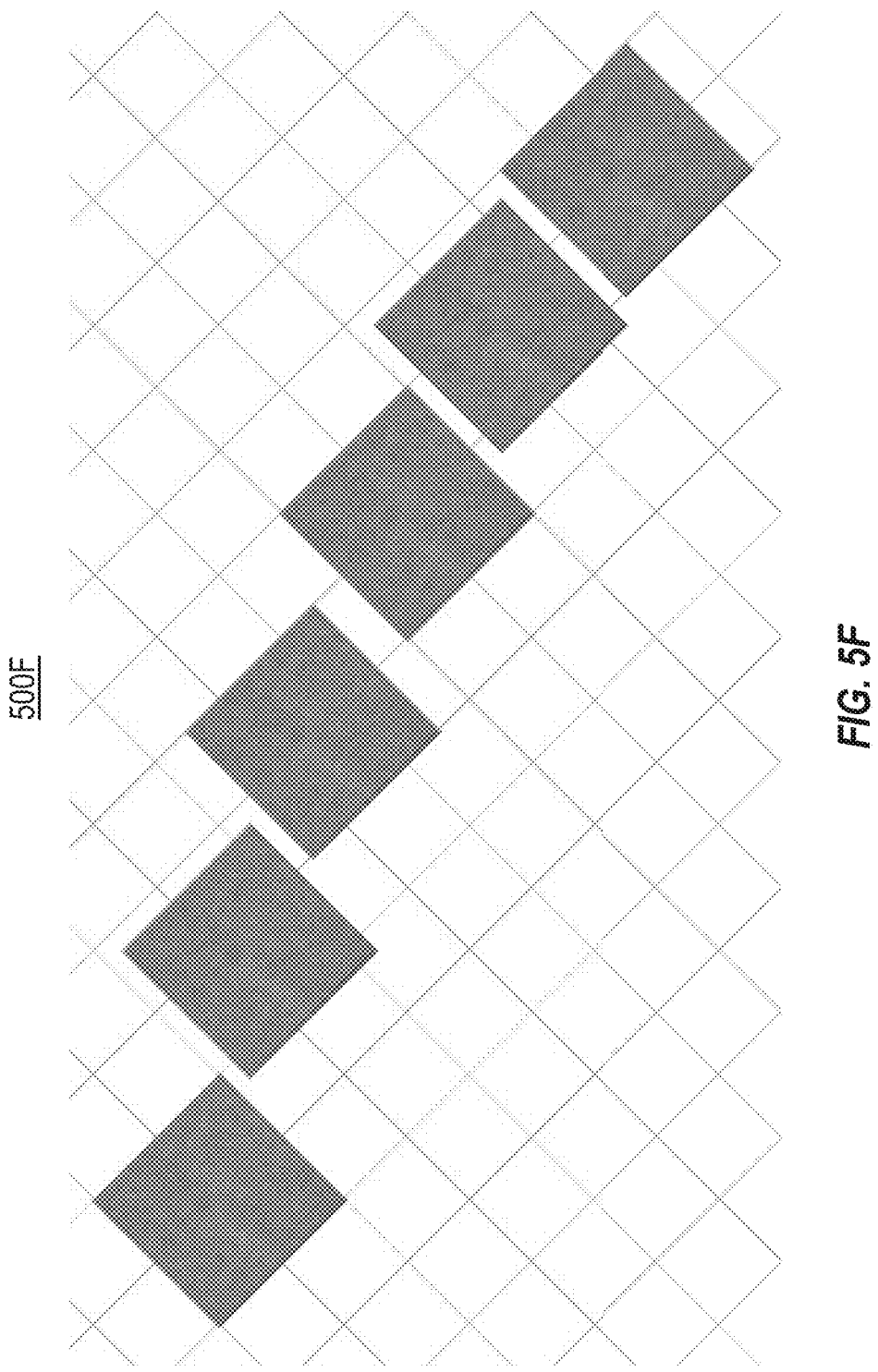
FIG. 5F illustrates different tiles being snapped to one or more grids or fractions of grids.

In some embodiments, the fraction of a grid that each tile may be snapped to is one of (1) a half of a grid, (2) a quarter of a grid, or (3) ⅛ of a grid. FIG. 5F illustrates examples of a square-shaped tile that is snapped at a grid or a fraction of a grid. As illustrated, in some embodiments, each tile may be snapped at a border of a grid, at a ⅛ of a grid, a quarter of a grid, and/or a half of a grid. For example, when a user places a tile at a position that is closest to a ⅛ of a grid, the tile is snapped to the ⅛ of the grid; and when a user places a tile at a position that is closest to a ¼ of a grid, the tile is snapped to a quarter of the grid.

Similarly, after the user selects that tile borders are to be shown in the design area, the computing system is configured to show each tile in the design area with a darkened border. On the other hand, after the user selects that tile borders are not to be shown in the design area, the computing system is configured to show each tile in the design area without a darkened border.

Referring to FIG. 4, a design is displayed in the design area 470 based on one or more user inputs. Generating the design includes (i) receiving a first user input, selecting at least one of the plurality of selectable attributes of tiles from the user selection area, (ii) receiving a second user input, placing a tile (e.g., tile 490) having the selected at least one attribute at a particular position of the design area, (iii) identifying a grid or a fraction of a grid that is closest to the particular position indicated by the second user input, (iv) snapping the tile to the identified grid or the identified fraction of the grid in the design area, and (v) repeating steps (i) through (iv) until the design is completed.

In some embodiments, the user can also modify the tiles in the design area 470. For example, a user may select a particular tile (e.g., tile 490) placed in the design area 470. Thereafter, the user may then select at least one of the plurality of attributes of tiles from the user selection area 480 that was not previously selected and/or change one or more attributes of the selected tile based on the selected at least one attribute.

Figure 5G:
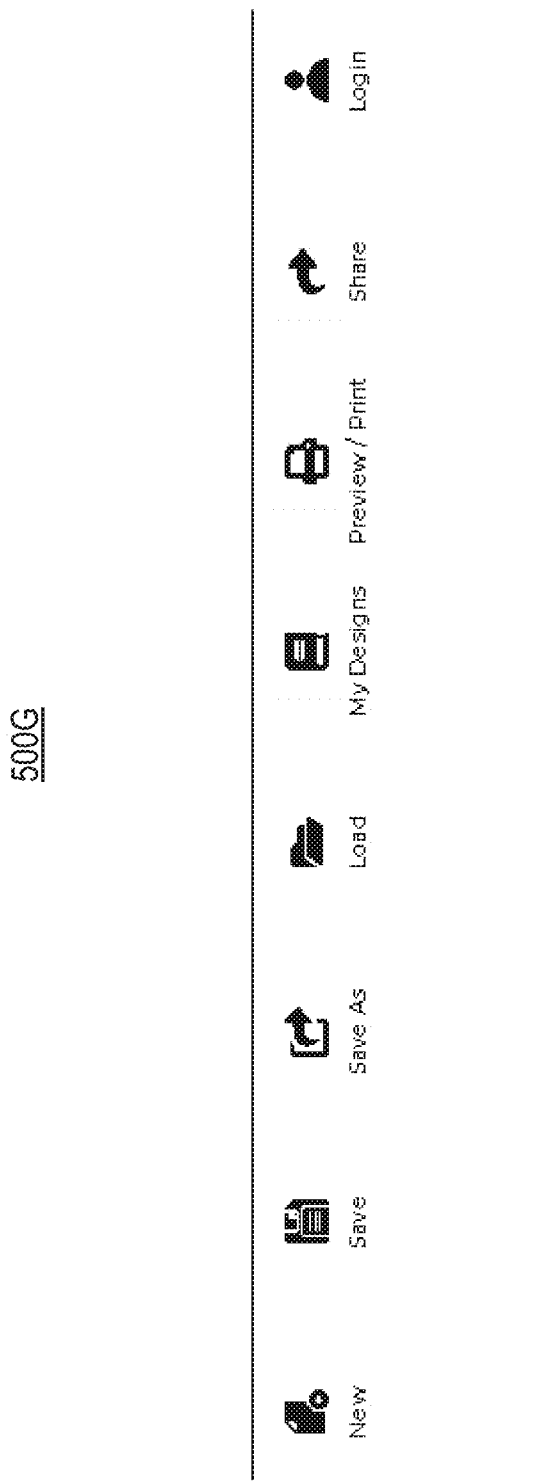
FIG. 5G illustrates an enlarged view of another subarea of the user selection area of FIG. 4 that allows a user to save, preview, and/or print their designs and load or select from a collection of their previously saved designs.

Once the user finished their design, the user can then choose to save or print the design, and later load the saved design back to the graphical user interface of the design studio 400. In some embodiments, a subarea 410 may be implemented to allow a user to save, print, reload designs. FIG. 5G illustrates an enlarged view 500G of the subarea 410 of FIG. 4. As illustrated, the subarea 500G has a plurality of icons, including (but not limited to) a "New" icon, a "Save" icon, a "Save As" icon, a "Load" icon, a "My Designs" icon, a "Preview/Print" icon, a "Share" icon, and/or a "Login" icon. When the user clicks the "new" icon, a new design file is created. When the user clicks the "save" icon, a current design shown in the design area is saved as a current design file. When the user clicks the "Save As" icon, the current design may be saved as a new design file with a new name. When the user clicks the "Load" icon, the user is allowed to load a previously saved design into the design area 470. When the user clicks the "My Designs" icon, a list of saved designs of the user may be displayed to the user. When the user clicks the "Preview/Print" button, a preview of the design in the design area 470 may be displayed to the user, and the user may choose to print out the preview of the design. When the user clicks the "Share" icon, the user may be allowed to share the design in the design area with another user (e.g., a friend, a family member, etc.). When the user clicks the "Login" account, the user can log into their account. In some embodiments, when the user is to save a design or access previously saved design, the user may be required to log into their account. When a new user tries to save a new design, the new user may be prompted to register a new user account first, and the new design is then saved in the newly registered user account.

In some embodiments, a total price of tiles placed in the design area 470 is computed and displayed to the user, which may be displayed in the any area of the graphical user interface 400. In some embodiments, the total price may be displayed at a left bottom corner of the graphical user interface 400. In some embodiments, the total price may be displayed at a right upper corner of the graphical user interface 400 next to the "add to cart" button 460.

In some embodiments, when the user clicks the "add to cart" button 460, all the tiles in the design area 470 are added to a shopping cart. In some embodiments, there may also be a shopping cart icon (similar to the shopping cart icon 230 of FIG. 2) displayed next to the "add to cart" button 460. When the user clicks the "add to cart" button 460 or the shopping cart icon, a list of items (e.g., all the tiles used in the design) in the shopping cart may be displayed in the graphical user interface. In some embodiments, each tile corresponds to a particular unit price, and the graphical user interface also includes the prices of the corresponding tiles.

Figure 5H:
FIG. 5H illustrates an example of a graphical user interface of a shopping cart generated based on a design shown in the design area of FIG. 4.
Figure 5H:
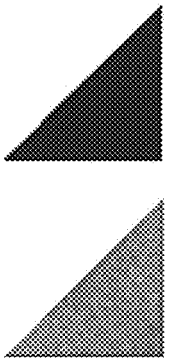
Figure 5H:
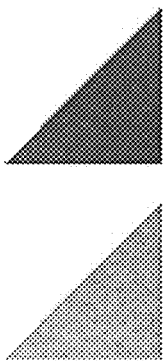
Figure 5H:
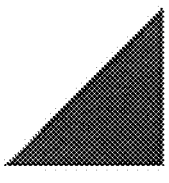
Figure 5H:
Figure 5H:
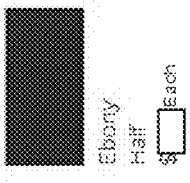
Figure 5H:
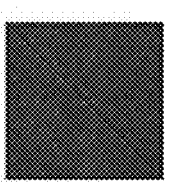
Figure 5H:
Figure 5H:
Figure 5H:

FIG. 5H illustrates an example of the second graphical user interface 500H that lists all the tiles in the design area 470 of FIG. 4. Assuming the mountain design shown in FIG. 4 resulted in the list of tiles shown in the graphical user interface 500H, the design in FIG. 4 requires 10 different types of tiles, namely 8 nickel colored triangle tiles, 7 mineral colored triangle tiles, 6 cast colored triangle tiles, 6 armor colored triangle tiles, 6 ebony colored triangle tiles, one cast colored square tile with slash pattern, one nickel colored half-shaped tile, two cast colored half-shaped tile, one ebony colored quarter-shaped tile, and one cast colored quarter shaped tile. As illustrated, next to each type of tiles, a unit price and a unit number are also displayed. The unit prices and the unit numbers are then used to compute a total price shown at the bottom of the graphical user interface 500H. The user can then choose to purchase the tiles or make modifications to the design.

In some embodiments, the computing system is further configured to compute an amount of adhesive (e.g., a number of adhesive tabs) required for installing all the tiles in the shopping cart and automatically adding the amount of adhesive into the shopping cart. The adhesive may be free or have its unit price, and the price of the required adhesive may be added to the total price of the shopping cart.

Referring back to FIG. 1, in some embodiments, once the user checks out the shopping cart, the server computing system 130 may record the purchase transaction in a record stored in the one or more storage devices 136. In some embodiments, the record is accessible by a store representative, who can assemble a tile kit based on the record having a list of different types of tiles and a number of adhesive tabs, and provide the tile kit to the user. In some embodiments, the purchase record is automatically sent to a computing system of a store representative via an email, a text message, and/or a store-side application. In some embodiments, a computing system, a robotic system, and/or a combination thereof are configured to assemble the tile kit based on the record having a list of different types of tiles and a number of adhesive tabs.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
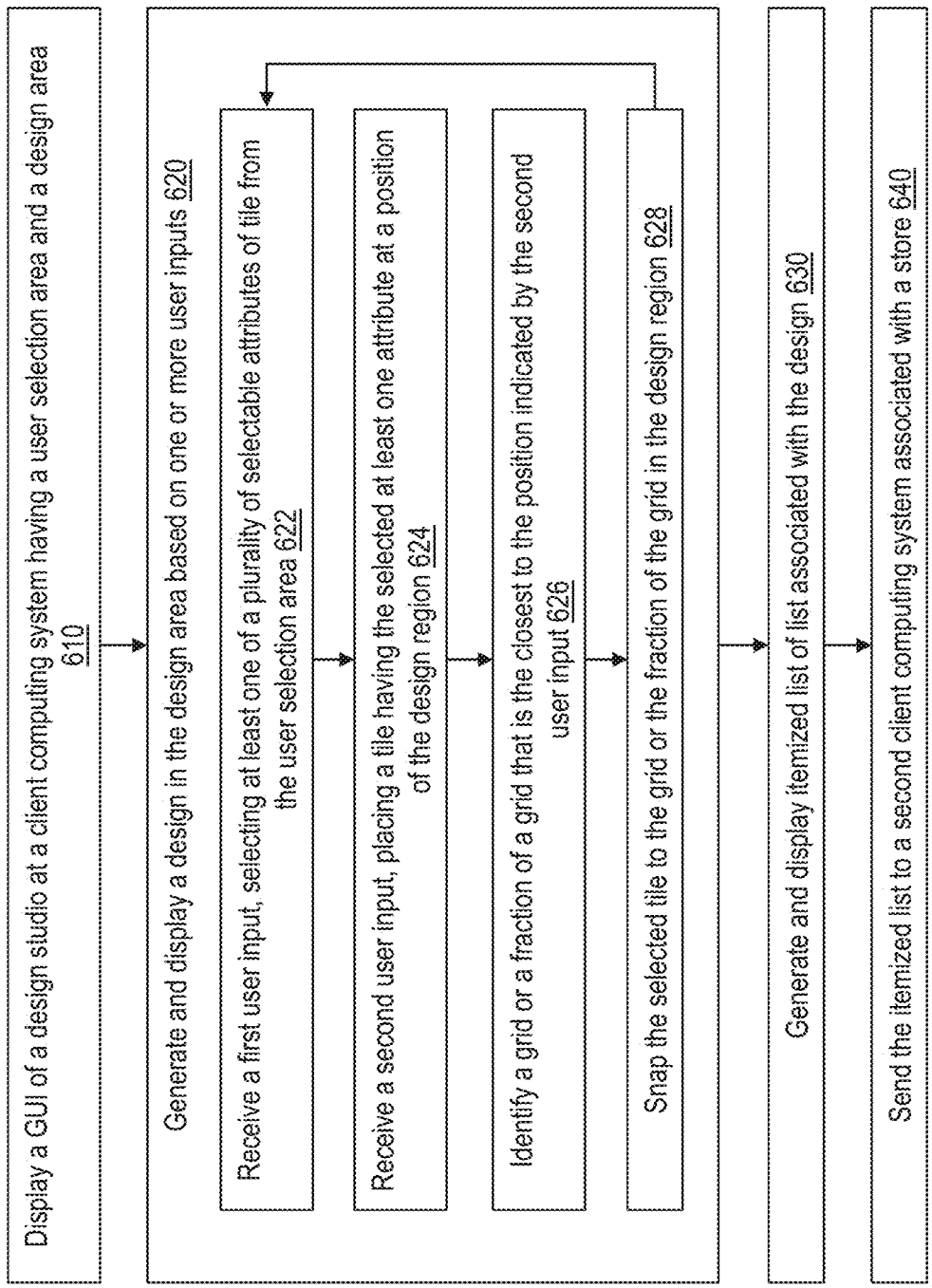
FIG. 6 illustrates a flowchart of an example method for generating a tile pattern design and creating a tile kit based on the design.

FIG. 6 illustrates a flowchart of an example method 600 for generating a tile pattern design based on user inputs, which may be performed at a server computing system (e.g., server computing system 130 of FIG. 1) The method 600 includes displaying a graphical user interface of a design studio at a client computing system associated with a customer user (act 610). The graphical user interface of the design studio has a design area and a user selection area. The design area has a plurality of grids, and the user selection area includes a plurality of selectable attributes of tile. In some embodiments, the plurality of attributes includes at least one of (1) one or more shapes of tile, (2) one or more colors of tile, (3) one or more orientations of tile, and/or (4) one or more patterns of tile. The method 600 also includes generating and displaying a design in the design area based on one or more user inputs (act 620). In some embodiments, act 620 includes receiving a first user input, selecting at least one of a plurality of selectable attributes of tile from the user selection area (act 622) and receiving a second user input, placing a tile having the selected at least one attribute at a position of the design region. In some embodiments, act 620 further includes identifying a grid or a fraction of a grid that is closest to the particular position indicated by the second user input (act 626) and snapping the tile to the identified grid or the identified fraction of the grid in the design area. Acts 622, 624, 626, and 628 can be repeated as many times as necessary until the user completes their design.

In some embodiments, the method 600 further includes generating and displaying an itemized list of tiles associated with the design (act 630). In some embodiments, the method 600 further includes sending the itemized list of tiles associated with the design to a second client computing system associated with a store (act 640). For example, when the user places the design in a shopping cart, an itemized list of tiles associated with the design (e.g., a list of tiles in a shopping cart shown in FIG. 5H) may be displayed to the user. When the user checks out the shopping cart, the itemized list of tiles associated with the design and/or the order may be sent to a second client computing system associated with a store. A store representative can then assemble the tile kit based on the received itemized list. Alternatively, a robotic system connected to the second client computing system may be configured to assemble the tile kit automatically based on the received itemized list associated with the design.

Figure 7:
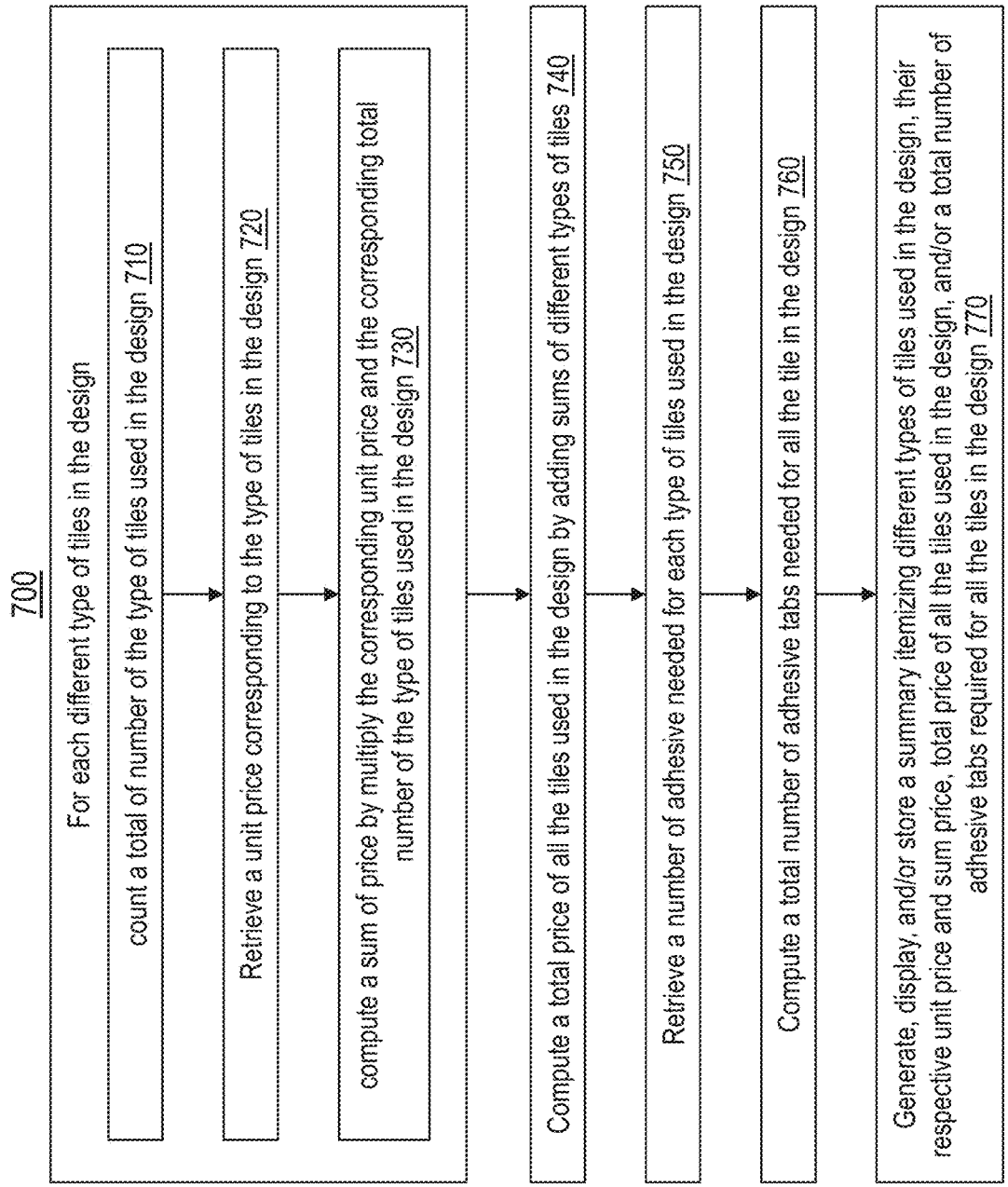
FIG. 7 illustrates a flowchart of an example method for generating and displaying an itemized list of tiles associated with a tile pattern design.

FIG. 7 illustrates a flowchart of a method 700 for generating and displaying an itemized list of tiles associated with the design, which corresponds to act 630 of FIG. 6. The method 700 includes, for each of different types of tiles used in the design, counting a total number of the type of tiles used in the design (act 710), retrieving a unit price corresponding to the type of tile in the design (act 720), and computing a sum of price by multiplying the corresponding unit price and the corresponding total number of the type of tiles used in the design (act 730). In some embodiments, a data structure storing prices of different types of tiles is stored in the one or more storage devices 136 of the server computing system 130, and the server computing system 130 is configured to retrieve the stored prices based on the types of tiles used in the design. The method 700 further includes computing a total price of all the tiles used in the design by adding the previously computed sums of different types of tiles (act 740).

In some embodiments, the method 700 also includes retrieving an amount of adhesive needed for each type of tiles used in the design (act 750) and computing a total amount of adhesive needed for all the tiles in the design (act 760). In some embodiments, a data structure storing an amount of adhesive for each type of tiles is stored in the one or more storage devices 136 of the server computing system 130, and the server computing system 130 is configured to retrieve the stored amount of adhesive for each type of tiles used in the design. Generally, a larger tile requires a greater number of adhesive, and a smaller tile requires a fewer number of adhesive. In some embodiments, the tiles are felt tiles, and the adhesive is adhesive tabs. A larger felt tile requires a greater number of adhesive tabs, and a smaller felt tile requires a fewer number of adhesive tabs.

In some embodiments, the method 700 also includes generating, displaying, and/or storing a summary itemizing different types of tiles used in the design, their respective unit price, and sum price, a total price of all the tiles used in the design, and/or a total number of adhesive tabs required for all the tiles in the design (act 770).

In some embodiments, the design and the summary are stored relationally in a record associated with the user who has created the design. In some embodiments, the user is required to create an account before storing the design and the order summary. In some embodiments, once a new order is recorded in the record, the server computing system 130 is further configured to generate a notification to the second client computing system associated with the store.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Accordingly, the present invention can be described in terms of one or more alternative aspects and configurations. For example, in a first aspect, a server computing system can include: one or more processors; and one or more computer-readable storage devices having stored thereon computer-executable instructions that are structured such that, when executed by the one or more processors, cause the computing system to perform the following: display a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile; generate and display a design in the design area based on one or more user inputs at the client computing system, generating the design comprising: (i) receiving a first user input, selecting at least one of the plurality of selectable attributes of tile from the user selection area; (ii) receiving a second user input, placing a tile having the selected at least one attribute at a particular position of the design area; (iii) identifying a grid or a fraction of a grid that is closest to the particular position indicated by the second user input; (iv) snapping the tile to the identified grid or the identified fraction of the grid in the design area; and (v) repeating steps (i) through (iv) until the design is completed.

In a second aspect, the server computing system as recited in the first aspect, the computing system can further be configured to compute a size of the design, including a width of the design and a height of the design; and display the size of the design in the client computing system.

In a third aspect, the server computing system as recited in any of the first through second aspects, the computing system can further be configured to receive a third user input, selecting a tile placed in the design area; receive a fourth user input, selecting at least one of the plurality of attributes of tiles from the user selection area that was not previously selected; change one or more attributes of the selected tile based on the selected at least one attribute.

In a fourth aspect, the server computing system as recited in any of the first through third aspects, the computing system can further be configured to display a visualization associated with the client computing system, allowing the user to choose a premade design from a gallery of one or more premade designs or start a new design from scratch; in response to receiving a first user indication, choosing from a premade design from the gallery, display the gallery of one or more premade designs in the client computing system; and in response to receiving a second user indication, selecting a premade design from the gallery of one or more premade designs, display the selected premade design in the design area.

In a fifth aspect, the server computing system as recited in any of the first through fourth aspects, the computing system can further be configured to display a selectable choice in the client computing system, allowing the user to select whether tile borders are to be shown in the design area; in response to receiving a user indication, selecting that tile borders are to be shown in the design area, show each tile in the design area with a darkened border; and in response to receiving a user indication, selecting that tile borders are not to be shown in the design area, show each tile in the design area without a darkened border.

In a sixth aspect, the server computing system as recited in any of the first through fifth aspects, one or more shapes of tiles that are selectable by the user include (i) a 24 in×24 in square, (ii) a 12 in×12 in square, (iii) a 6 in×6 in square, (iv) a 3 in×3 in square, (v) a 24 in×12 in rectangle, (vi) a 12 in×6 in rectangle, (vii) a 12 in×3 in rectangle, (viii) a 12 in×12 in right triangle, (ix) a 24 in×6 in rectangle, (x) a hexagon, or (xi) a diamond shape.

In a seventh aspect, the computing system as recited in any of the first through sixth aspects, one or more orientations of tiles that are selectable by the user includes an increment of (i) 1 degree of change, (ii) 45 degrees, (iii) 90 degrees, (iv) 135 degrees, (v) 180 degrees, (vi) 225 degrees, (vii) 270 degrees, or (viii) 315 degrees, (ix) 360 degrees, or (x) combinations thereof.

In an eighth aspect, the server computing system as recited in any of the first through seventh aspects, one or more patterns of tiles that are selectable by a user include a blank pattern, a slash pattern having a diagonal line across a surface of tile, a cross pattern having two diagonal lines crossing a surface of a tile, a 4-square pattern having two crossing lines dividing a surface of a tile into four equal squares or rectangles, or a parallel pattern having a plurality of parallel lines dividing a surface of a tile into two or more rectangles in parallel.

In a ninth aspect, the server computing system as recited in any of the first through eighth aspects, one or more colors of tiles that are selectable by the user includes a zinc color, a nickel color, a moon color, an armor color, a mineral color, a cast color, an ebony color, a citrine color, an Aries color, a ruby color, a raspberry color, a lavender color, a baby-blue color, a sky color, a Cayman color, an admiral color, an oxford color, a kiwi color, a fresh-lime color, an emerald color, an aqua color, a coral color, a porcelain color, a latte color, a cashmere color, a timber color, an ash color, a jasper color, a palm color, a mustard color, a sage color, or a slate-blue color.

In a tenth aspect, the server computing system as recited in any of the first through ninth aspects, the fraction of a grid that each tile may be snapped to is one of (i) a half of a grid, (ii) a quarter of a grid, or (iii) an eighth of a grid.

In an eleventh aspect, the server computing system as recited in any of the first through tenth aspects, the computing system can further be configured to display a selectable choice in the client computing system, allowing the user to select whether each tile is to snap to a grid or a fraction of a grid; in response to a user indication, selecting that each tile is to snap to a grid or a fraction of a grid, perform steps (iii) and (iv) for each tile; and in response to a user indication, selecting that each tile is not to snap to a grid or a fraction of a grid, place each tile at the particular position based on the second user input without snapping to a grid or a fraction of a grid.

In a twelfth aspect, the server computing system as recited in any of the first through eleventh aspects, the computing system can further be configured to compute a total price of tiles used in the design; and display the computed total price at the client computing system.

In a thirteenth aspect, the server computing system as recited in any of the first through twelfth aspects, the computing system can further be configured to receive a user indication, adding all the tiles in the design area to a shopping cart, each tile corresponding to a particular unit price; and display the shopping cart in a second graphical user interface, listing all the tiles used in the design and the respective prices of the tiles.

In a fourteenth aspect, the server computing system as recited in any of the first through thirteenth aspects, the server computing system can further be configured to compute a number of adhesive tabs required for installing all the tiles in the shopping cart; and automatically add the number of adhesive tabs into the shopping cart.

In a fifteenth aspect, the server computing system as recited in any of the first through fourteenth aspects, the server computing system can further be configured to in response to checking out the shopping cart by the user, store an order record associated with the user in the one or more computer-readable hardware storage devices; and send the order record to a second client computing system associated with a tile store that provides tiles to the user.

In a sixteenth aspect, the server computing system as recited in any of the first through fifteenth aspects, the server computing system can further be configured to display a plurality of orientations of grid, allowing the user to select; and in response to receiving a user indication, selecting a particular orientation of grid, display the design area with grids having the selected orientation.

In a seventeenth aspect, the server computing system as recited in any of the first through sixteenth aspects, the server computing system can further be configured to display one or more input fields, allowing the user to input one or more dimensions of the design; and in response to receiving the user inputs of the one or more dimensions, display the design area having the one or more dimensions input by the user.

In an eighteenth aspect, the server computing system as recited in any of the first through seventeenth aspects, the system can further be configured to identify that a user has positioned two or more tiles in the design area such that one of the two or more tiles overlaps another of the two or more tiles; and visually identify the overlap.

In a nineteenth aspect, the server computing system as recited in any of the first through eighteenth aspects, the system can further be configured to generate a user instruction page for assembling the generated design; the instruction page includes: a diagram of the design where each tile located in the design; a list of each tile in the design, wherein the list provides a unique code and a tile type associated with each tile in the design, as well as a number of each selected for the design.

In a twentieth aspect, a method implemented by a computing system for generating tile pattern designs based on user inputs, the method can include: displaying a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile; generating and displaying a design in the design area based on one or more user inputs, generating the design comprising (i) receiving a first user input, selecting at least one of the plurality of selectable attributes of tile from the user selection area; (ii) receiving a second user input, placing a tile having the selected at least one attribute at a particular position of the design area; (iii) identifying a grid or a fraction of a grid that is closest to the particular position indicated by the second user input; (iv) snapping the tile to the identified grid or the identified fraction of the grid in the design area; and (v) repeating steps (i) through (iv) until the design is completed.

In a twenty-first aspect, the method as recited in the twentieth aspect, the computing system can further be reconfigured to display a selectable choice in the client computing system, allowing the user to select whether each tile is to snap to a grid or a fraction of a grid; in response to a user indication, selecting that each tile is to snap to a grid or a fraction of a grid, perform steps (iii) and (iv) for each tile; and in response to a user indication, selecting that each tile is not to snap to a grid or a fraction of a grid, place each tile at the particular position based on the second user input without snapping to a grid or a fraction of a grid.

In a twenty-second aspect, a computer program product includes: one or more hardware storage devices having stored thereon computer-executable instructions that are structured such that, when the computer-executable instructions are executed by one or more processors of a computing system, the computer-executable instructions cause the computing system to perform the following: display a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile; generate and display a design in the design area based on one or more user inputs, generating the design comprising: (i) receiving a first user input, selecting at least one of the plurality of selectable attributes of tile from the user selection area; (ii) receiving a second user input, placing a tile having the selected at least one attribute at a particular position of the design area; (iii) identifying a grid or a fraction of a grid that is closest to the particular position indicated by the second user input; (iv) snapping the tile to the identified grid or the identified fraction of the grid in the design area; and (v) repeating steps (i) through (iv) until the design is completed.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A server computing system comprising:
   one or more processors; and
   one or more computer-readable storage media having stored thereon computer-executable instructions that are structured such that, when executed by the one or more processors, cause the computing system to perform the following:
   display a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile;
   generate and display a design in the design area based on one or more user inputs at the client computing system, generating the design comprising:
   (i) receiving a first user input, selecting at least one of the plurality of selectable attributes of tile from the user selection area;
   (ii) receiving a second user input, placing a tile having the selected at least one attribute at a particular position of the design area;
   (iii) identifying a grid or a fraction of a grid that is closest to the particular position indicated by the second user input;
   (iv) snapping the tile to the identified grid or the identified fraction of the grid in the design area; and
   (v) repeating steps (i) through (iv) until the design is completed;
   receive a user indication, wherein the user indication triggers adding of all the tiles in the design area to a shopping cart, each tile corresponding to a particular unit price;
   in response to receiving the user indication, display the shopping cart in a second graphical user interface, wherein the shopping cart lists all the tiles used in the design and the respective prices of the tiles;
   in response to receiving the user indication, automatically compute a number of adhesive tabs required for installing all the tiles in the shopping cart; and
   in response to receiving the user indication, automatically add the number of adhesive tabs into the shopping cart such that a representation of the number of adhesive tabs is displayed in the shopping cart.

2. The server computing system of claim 1, the computing system further configured to:
   compute a size of the design, including a width of the design and a height of the design; and
   display the size of the design in the client computing system.

3. The server computing system of claim 1, the computing system further configured to:
   receive a third user input, selecting a tile placed in the design area;
   receive a fourth user input, selecting at least one of the plurality of attributes of tiles from the user selection area that was not previously selected; and
   change one or more attributes of the selected tile based on the selected at least one attribute.

4. The server computing system of claim 1, the computing system further configured to:
   display a visualization associated with the client computing system, allowing the user to choose a premade design from a gallery of one or more premade designs or start a new design from scratch;
   in response to receiving a first user indication, choosing from a premade design from the gallery, display the gallery of one or more premade designs in the client computing system; and
   in response to receiving a second user indication, selecting a premade design from the gallery of one or more premade designs, display the selected premade design in the design area.

5. The server computing system of claim 1, wherein the computing system further configured to:

display a selectable choice in the client computing system, allowing the user to select whether tile borders are to be shown in the design area;
in response to receiving a user indication, selecting that tile borders are to be shown in the design area, show each tile in the design area with a darkened border; and
in response to receiving a user indication, selecting that tile borders are not to be shown in the design area, show each tile in the design area without a darkened border.

6. The server computing system of claim 1, wherein the one or more shapes of tiles that are selectable by the user include one of:
(i) a 24 in×24 in square,
(ii) a 12 in×12 in square,
(iii) a 6 in×6 in square,
(iv) a 3 in×3 in square,
(v) a 24 in×12 in rectangle,
(vi) a 12 in×6 in rectangle,
(vii) a 12 in×3 in rectangle,
(viii) a 12 in×12 in right triangle,
(ix) a 24 in×6 in rectangle,
(x) a hexagon, or
(xi) a diamond shape.

7. The computing system of claim 1, wherein one or more orientations of tiles that are selectable by the user includes an increment of:
(i) 1 degree of change,
(ii) 45 degrees of change,
(iii) 90 degrees of change,
(iv) 135 degrees of change,
(v) 180 degrees of change,
(vi) 225 degrees of change,
(vii) 270 degrees of change,
(viii) 315 degrees of change,
(ix) 360 degrees of change, or
(x) combinations thereof.

8. The server computing system of claim 1, wherein the fraction of a grid that each tile may be snapped to is one of (i) a half of a grid, (ii) a quarter of a grid, or (iii) an eighth of a grid.

9. The server computing system of claim 1, the computing system further configured to:
display a selectable choice in the client computing system, allowing the user to select whether each tile is to snap to a grid or a fraction of a grid;
in response to a user indication, selecting that each tile is to snap to a grid or a fraction of a grid, perform steps (iii) and (iv) for each tile; and
in response to a user indication, selecting that each tile is not to snap to a grid or a fraction of a grid, place each tile at the particular position based on the second user input without snapping to a grid or a fraction of a grid.

10. The server computing system of claim 1, the computing system further configured to:
compute a total price of tiles used in the design; and
display the computed total price at the client computing system.

11. The server computing system of claim 1, the server computing system further configured to:
in response to checking out the shopping cart by the user, store an order record associated with the user in the one or more computer-readable storage media; and
send the order record to a second client computing system associated with a tile store that provides tiles to the user.

12. The server computing system of claim 1, the server computing system further configured to:

display a plurality of orientations of grid, allowing the user to select; and
in response to receiving a user indication, selecting a particular orientation of grid, display the design area with grids having the selected orientation.

13. The server computing system of claim 1, the server computing system further configured to:
display one or more input fields, allowing the user to input one or more dimensions of the design; and
in response to receiving the user inputs of the one or more dimensions, display the design area having the one or more dimensions input by the user.

14. The server computing system of claim 1, the system further configured to:
identifying that a user has positioned two or more tiles in the design area such that one of the two or more tiles overlaps another of the two more tiles; and
visually identifying the overlap.

15. The server computing system of claim 1, the system further configured to:
generate a user instruction page for assembling the generated design;
wherein the instruction page includes:
a diagram of the design where each tile located in the design; and
a list of each tile in the design, wherein the list provides a unique code and a tile type associated with each tile in the design, as well as a number of each selected for the design.

16. A method implemented at a computing system for generating tile pattern designs based on user inputs, the method comprising:
displaying a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile;
generating and displaying a design in the design area based on one or more user inputs, generating the design comprising:
(i) receiving a first user input, selecting at least one of the plurality of selectable attributes of tile from the user selection area;
(ii) receiving a second user input, placing a tile having the selected at least one attribute at a particular position of the design area;
(iii) identifying a grid or a fraction of a grid that is closest to the particular position indicated by the second user input;
(iv) snapping the tile to the identified grid or the identified fraction of the grid in the design area; and
(v) repeating steps (i) through (iv) until the design is completed;
receiving a user indication, wherein the user indication triggers adding of all the tiles in the design area to a shopping cart, each tile corresponding to a particular unit price;
in response to receiving the user indication, displaying the shopping cart in a second graphical user interface, wherein the shopping cart lists all the tiles used in the design and the respective prices of the tiles;

in response to receiving the user indication, automatically computing a number of adhesive tabs required for installing all the tiles in the shopping cart; and in response to receiving the user indication, automatically adding the number of adhesive tabs into the shopping cart such that a representation of the number of adhesive tabs is displayed in the shopping cart.

17. The method of claim 16, the computing system further reconfigured to:

display a selectable choice in the client computing system, allowing the user to select whether each tile is to snap to a grid or a fraction of a grid;

in response to a user indication, selecting that each tile is to snap to a grid or a fraction of a grid, perform steps (iii) and (iv) for each tile; and in response to a user indication, selecting that each tile is not to snap to a grid or a fraction of a grid, place each tile at the particular position based on the second user input without snapping to a grid or a fraction of a grid.

18. A computer program product comprising one or more computer-readable storage media having stored thereon computer-executable instructions that are structured such that, when the computer-executable instructions are executed by one or more processors of a computing system, the computer-executable instructions cause the computing system to perform the following:

display a graphical user interface of a design studio at a client computing system, the graphic user interface of the design studio having a design area and a user selection area, the design area having a plurality of grids, and the user selection area including a plurality of selectable attributes of tile, the plurality of attributes comprising at least one of (1) one or more shapes of tile, (2) one or more colors of tile, (3) one or more orientations of tile; or (4) one or more patterns of tile;

generate and display a design in the design area based on one or more user inputs, generating the design comprising:

(i) receiving a first user input, selecting at least one of the plurality of selectable attributes of tile from the user selection area;

(ii) receiving a second user input, placing a tile having the selected at least one attribute at a particular position of the design area;

(iii) identifying a grid or a fraction of a grid that is closest to the particular position indicated by the second user input;

(iv) snapping the tile to the identified grid or the identified fraction of the grid in the design area; and (v) repeating steps (i) through (iv) until the design is completed;

automatically compute or update a size of the design generated and displayed in the design area via repeating steps (i) through (iv) until the design is completed; and display the automatically computed or updated size of the design in the client computing system.

\* \* \* \* \*